United States Patent
Patton

(10) Patent No.: US 7,310,103 B2
(45) Date of Patent: Dec. 18, 2007

(54) PIPELINED 2D VIEWPORT CLIP CIRCUIT

(75) Inventor: Charles Patton, Dublin, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 349 days.

(21) Appl. No.: 10/091,176

(22) Filed: Mar. 5, 2002

(65) Prior Publication Data

US 2003/0169277 A1  Sep. 11, 2003

(51) Int. Cl.
*G09G 5/00* (2006.01)
*G06T 15/40* (2006.01)

(52) U.S. Cl. .................. 345/620; 345/622; 345/623; 345/624; 345/628; 345/619; 345/421

(58) Field of Classification Search .......... 345/420, 345/421, 581, 619–628
See application file for complete search history.

(56) References Cited

U.S. PATENT DOCUMENTS

| | | | |
|---|---|---|---|
| 4,710,767 A * | 12/1987 | Sciacero et al. ............ 345/563 |
| 5,012,433 A | 4/1991 | Callahan et al. |
| 5,051,737 A * | 9/1991 | Akeley et al. ............... 345/622 |
| 5,455,897 A | 10/1995 | Nicholl et al. |
| 5,515,494 A | 5/1996 | Lentz |
| 5,559,937 A * | 9/1996 | Takeda ....................... 345/627 |
| 5,883,634 A * | 3/1999 | Narayanaswami .......... 345/628 |
| 6,771,264 B1 * | 8/2004 | Duluk et al. ................. 345/426 |
| 6,831,660 B1 * | 12/2004 | Kipping et al. ............. 345/625 |
| 6,930,688 B1 * | 8/2005 | Pether et al. ............... 345/502 |

* cited by examiner

*Primary Examiner*—Chante Harrison
(74) *Attorney, Agent, or Firm*—Meyertons Hood Kivlin Kowert & Goetzel, P.C.; Jeffrey C. Hood; Martin R. Wojcik

(57) ABSTRACT

A system and method for performing viewport clipping for multiple viewports using a pipeline. The pixel address coordinates are compared against boundaries of a first viewport window. The results of this comparison, along with the pixel address coordinates, are registered and passed on to the next pipeline stage. There, the pixel address coordinates are compared against the boundaries of a second viewport window. The comparison results are combined with those passed from the previous stage, and the results are again registered. This scheme is repeated until the pixel has been tested against all the viewport window boundaries, with the intermediate results being combined into a single result indicative of whether the pixel is to be passed to the subsequent stages of the graphics pipeline or clipped.

23 Claims, 12 Drawing Sheets

PIPELINED 2D VIEWPORT CLIP CIRCUIT

BACKGROUND OF THE INVENTION

1. Field of the Invention

This invention relates generally to the field of computer graphics and, more particularly, to a system for performing clipping for multiple windows using a pipeline.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

A typical screen may display a plurality of windows, also referred to as "viewport windows" or simply "viewports". Each window may correspond to a different application, or a different instance of the same application. Pixels may be mapped to 2-D windows on the screen. To aid in the acceleration of window system processing, circuitry for 2-D viewport clipping may be included in a hardware graphics rendering pipeline. Using programmable values, this circuit may determine whether or not a pixel falls within the boundaries of a window. If it does, the pixel may be propagated on to subsequent stages of the rendering pipeline for eventual display within the window. If not, the pixel may be clipped and dropped from the pipeline.

This 2-D viewport clipping function can be implemented in hardware with a set of subtractors that compare the X and Y address coordinates of the pixel to be rendered with the X and Y address coordinates of the vertices that define the 2-D viewport clipping windows. However, when it is necessary for the hardware to support multiple viewport clipping windows, feeding the address coordinates of the pixel to a large set of subtractors can result in timing and routing problems when laying out the circuit. It would be advantageous to eliminate the timing and routing problems in implementing the 2-D viewport clipping function in hardware.

SUMMARY OF THE INVENTION

The problems set forth above may at least in part be solved in some embodiments by a system or method for using a pipeline circuit for viewport window clipping.

The method comprises passing the pixel through the pipeline. The pipeline may comprise two or more pipeline segments (for example: the pipeline may comprise a series of 2D viewport clip circuits as shown in FIGS. 11a-f and FIG. 12). The number of pipeline segments may vary depending on implementation of the pipeline.

The method may further comprise computing a window result in each one of the two or more pipeline segments. Each one of the two or more pipeline segments corresponds to one of one or more windows. The window result comprises an indication of inclusion of the pixel within the corresponding one of the one or more windows.

The method may further comprise outputting a window word from each one of the two or more pipeline segments. In one embodiment, outputting the window word comprises, for each of the two or more pipeline segments, except for a last pipeline segment, passing the window word to a next pipeline segment. The window word comprises the window result from the current pipeline segment and from previous pipeline segments.

The method may also comprise examining the window word available in the last pipeline segment. The window word may be examined to determine if the pixel is included in the one or more windows.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
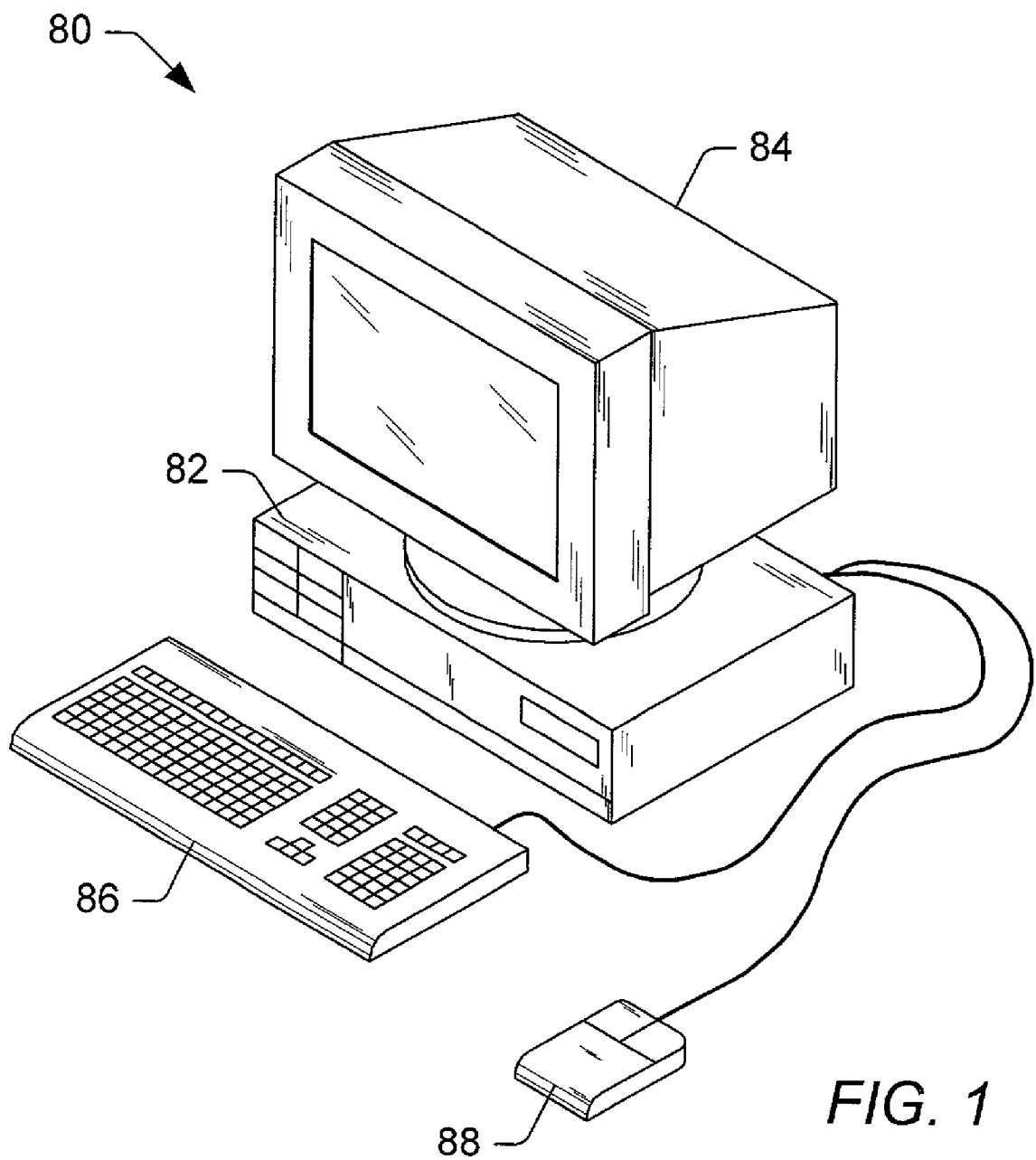
FIG. 1 is a perspective view of one embodiment of a computer system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
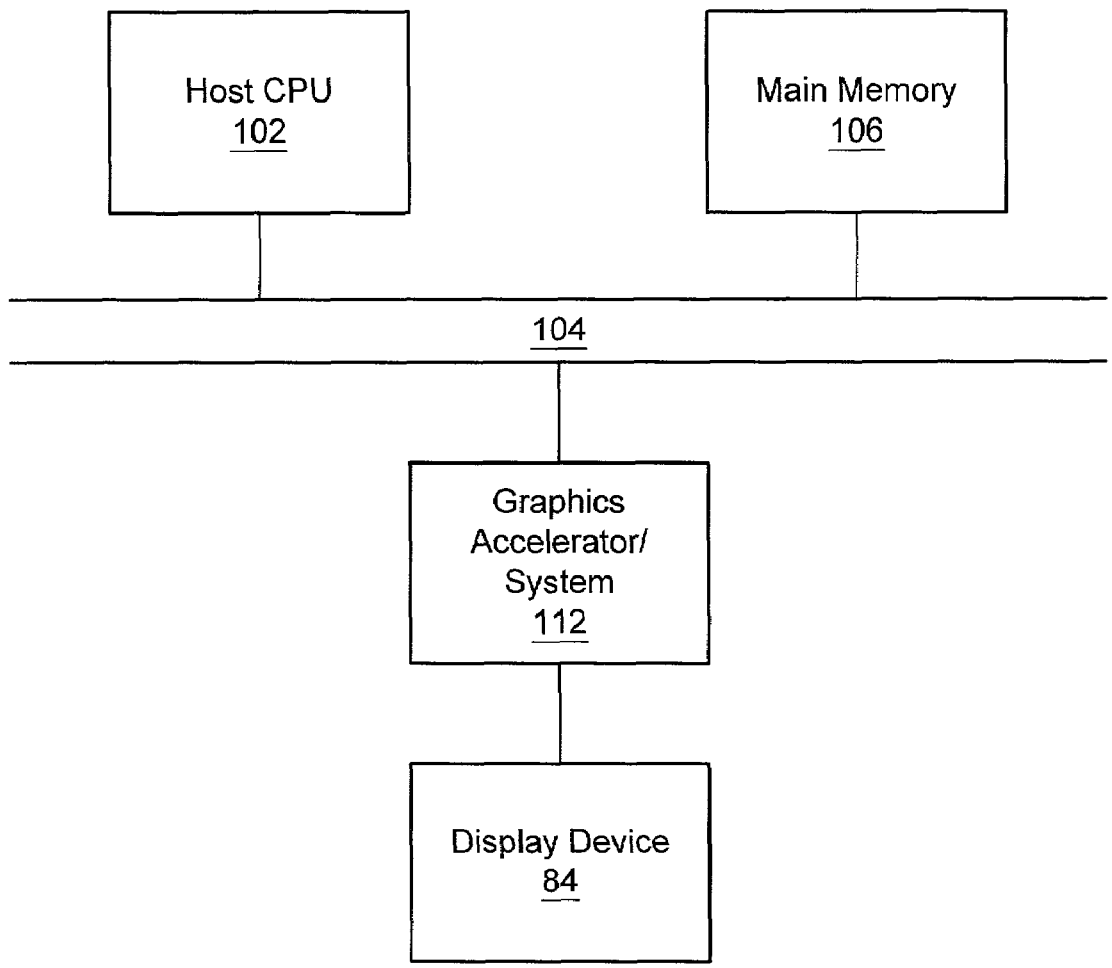
FIG. 2 is a simplified block diagram of one embodiment of a computer system, according to one embodiment.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
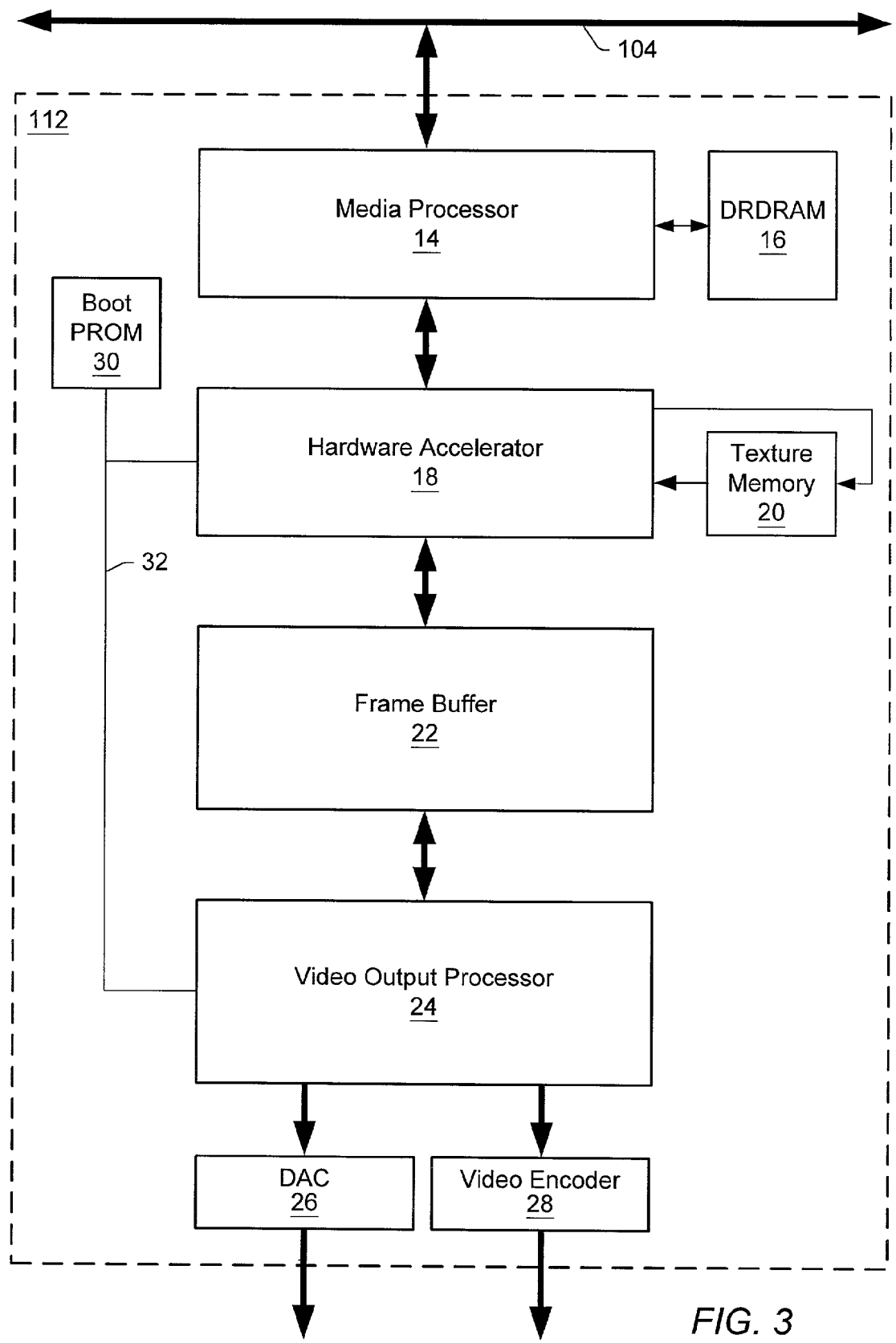
FIG. 3 is a functional block diagram of one embodiment of a graphics system, according to one embodiment.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
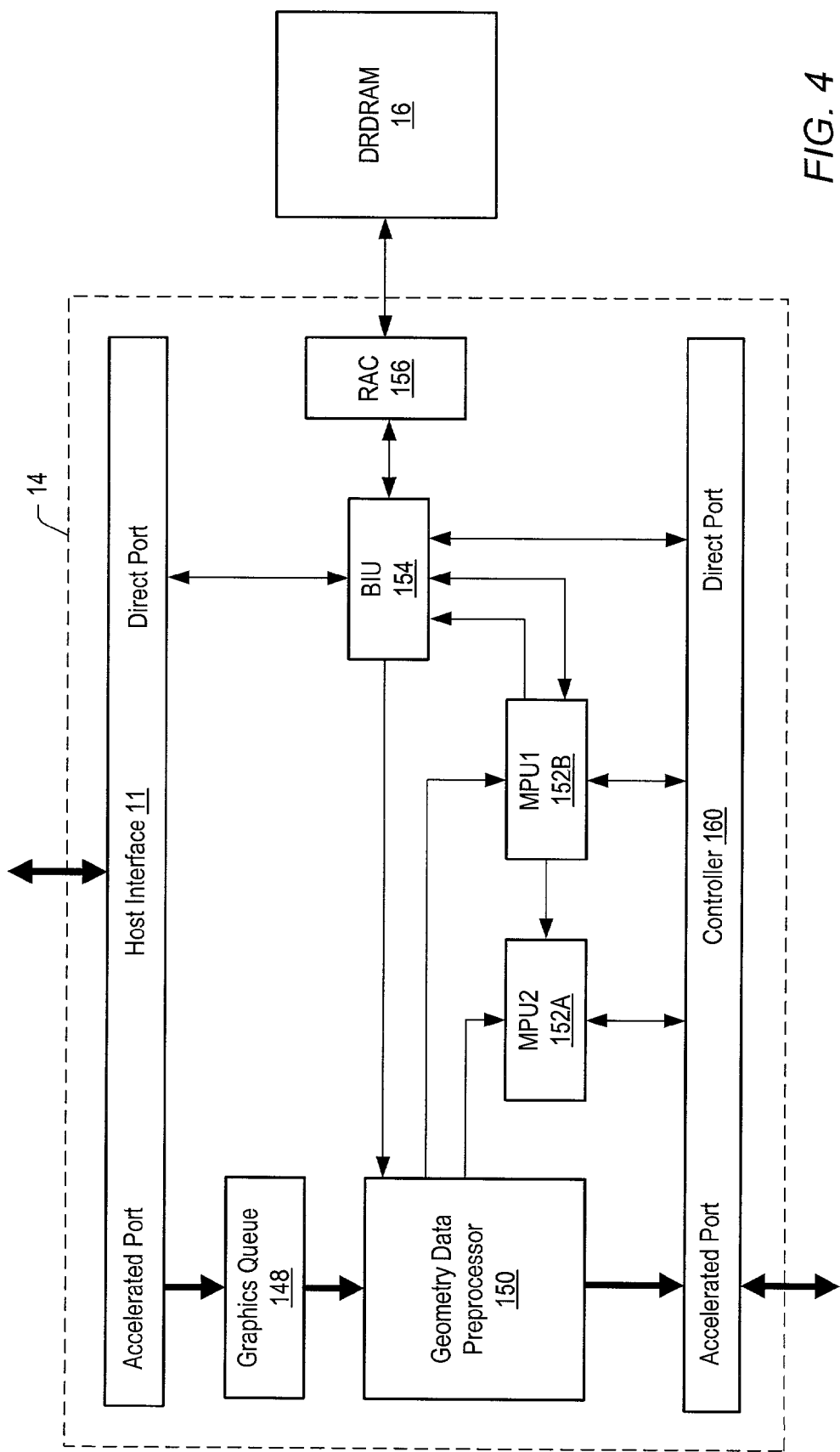
FIG. 4 is a functional block diagram of one embodiment of the media processor of FIG. 3, according to one embodiment.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
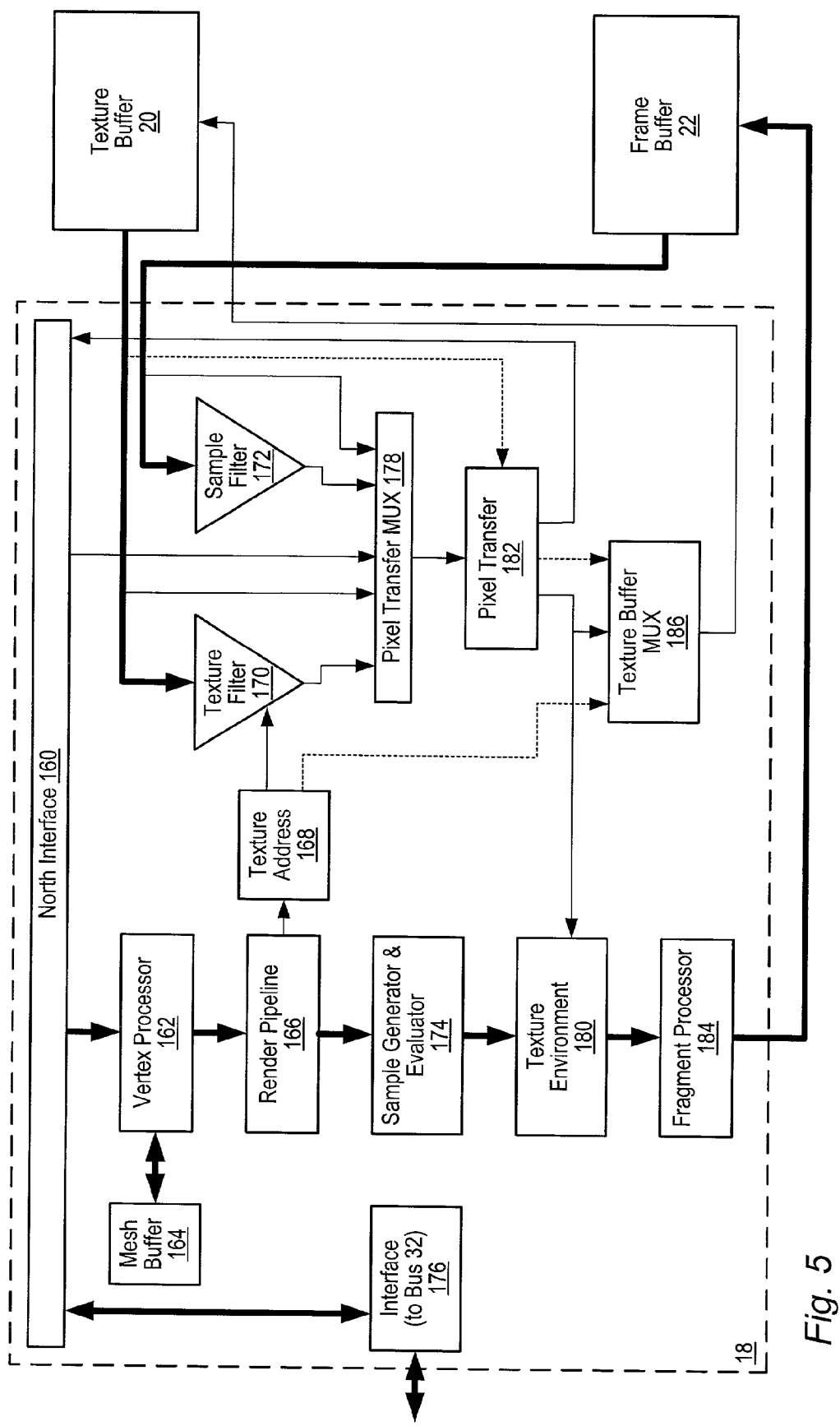
FIG. 5 is a functional block diagram of one embodiment of the hardware accelerator of FIG. 3, according to one embodiment.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
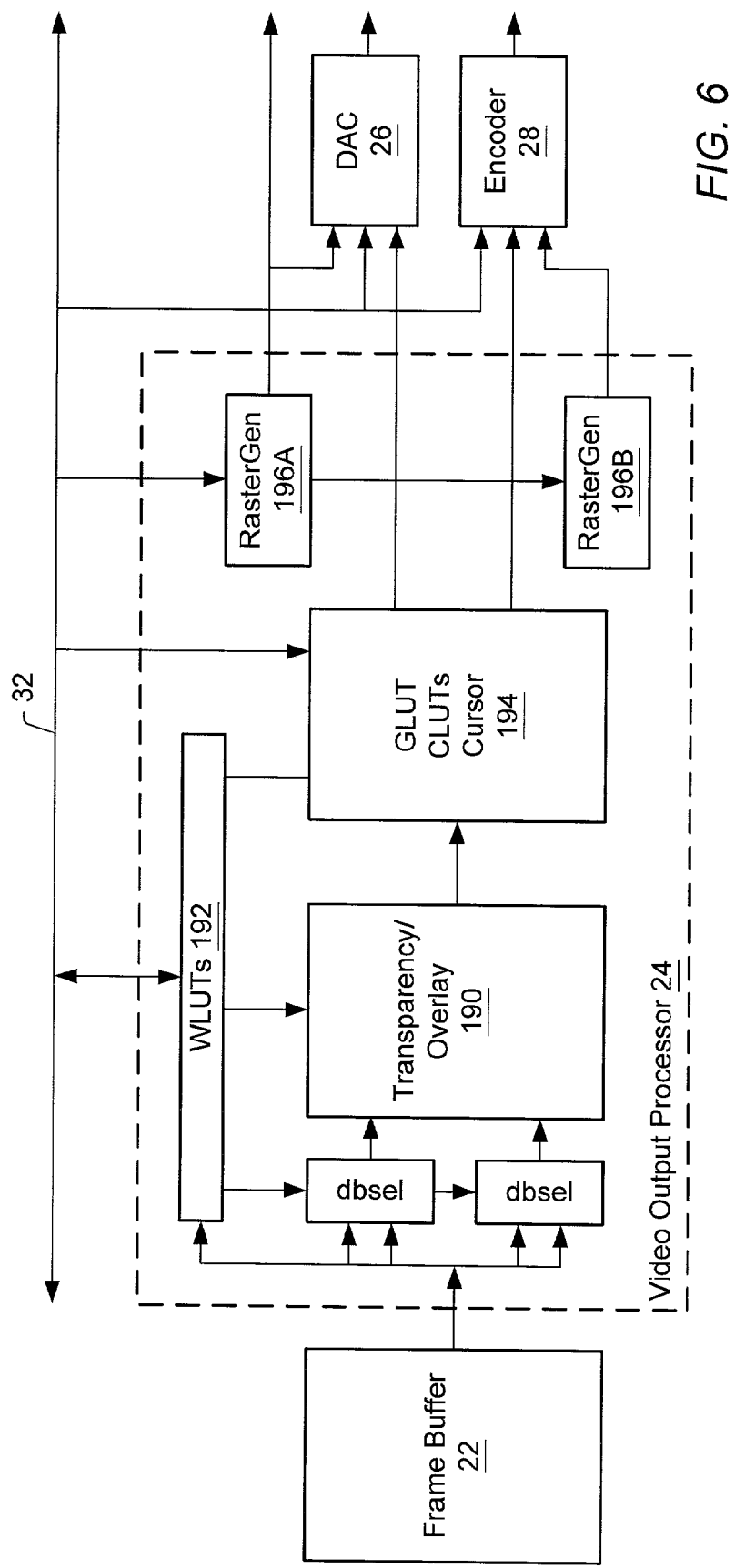
FIG. 6 is a functional block diagram of one embodiment of the video output processor of FIG. 3, according to one embodiment.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
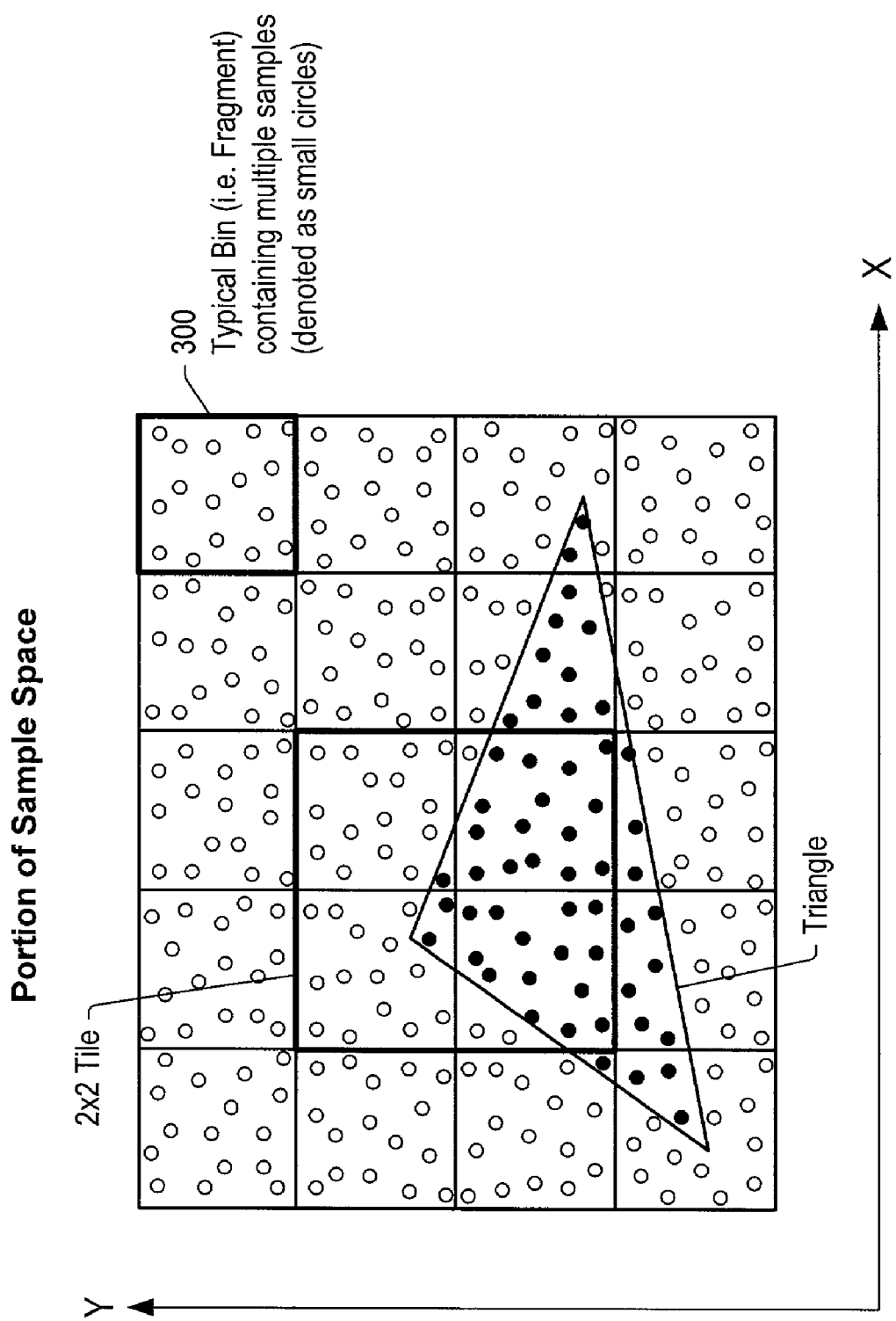
FIG. 7 is an illustration of a sample space partitioned into an array of bins, according to one embodiment.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Figure 8:
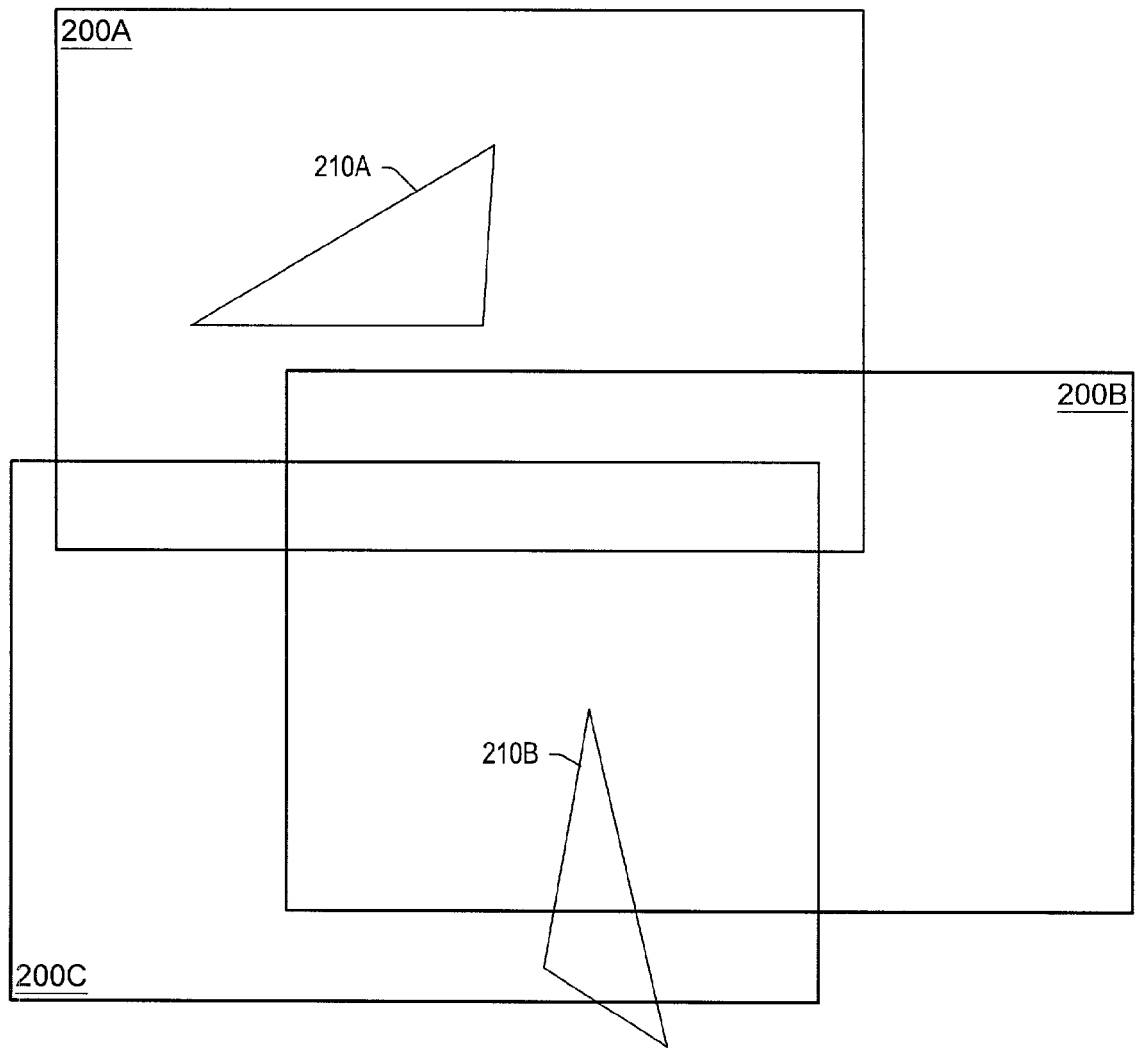
FIG. 8 is an illustration of 2-D viewport clipping windows, according to one embodiment.

FIG. 8—2-D Viewport Clipping Windows

FIG. 8 illustrates an exemplary embodiment of 2-D viewport clipping windows. Clipping windows, also referred to herein simply as "windows" (e.g. windows 200A, 200B, and 200C) may define boundaries for each viewport on a screen. The number of windows on screen may vary depending on the application and the user.

In one embodiment, objects such as objects 210A and 210B may be located in various windows 200A, 200B, and 200C. Objects 210A and 210B may be located entirely in one window, entirely outside a window, or partially located inside one or more windows. Each object 210A, 210B may include one or more pixels. The number of windows 200A-200C may vary depending on the type and number of applications running on the computer system.

Figure 9:
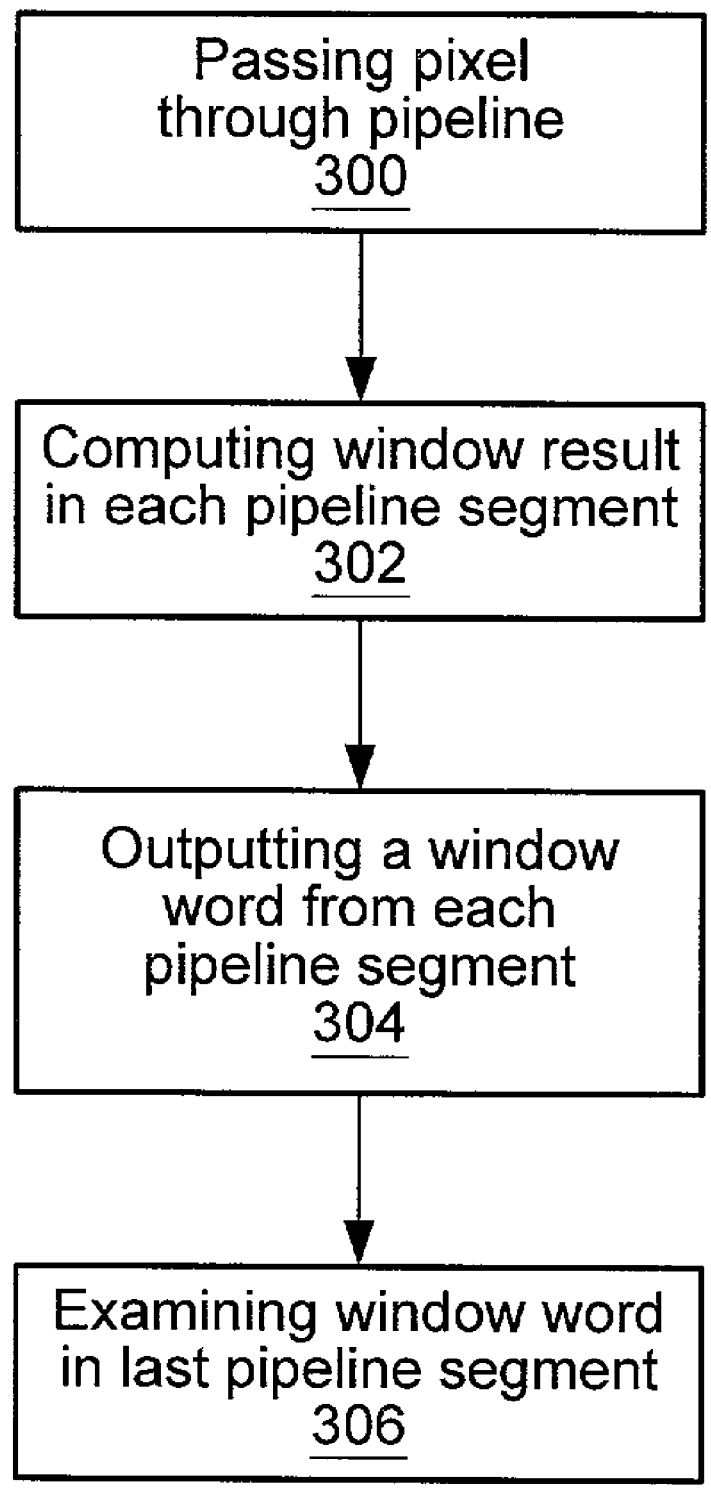
FIG. 9 is a flowchart diagram for comparing a pixel against one or more windows using a pipeline, according to one embodiment.
Figure 12:
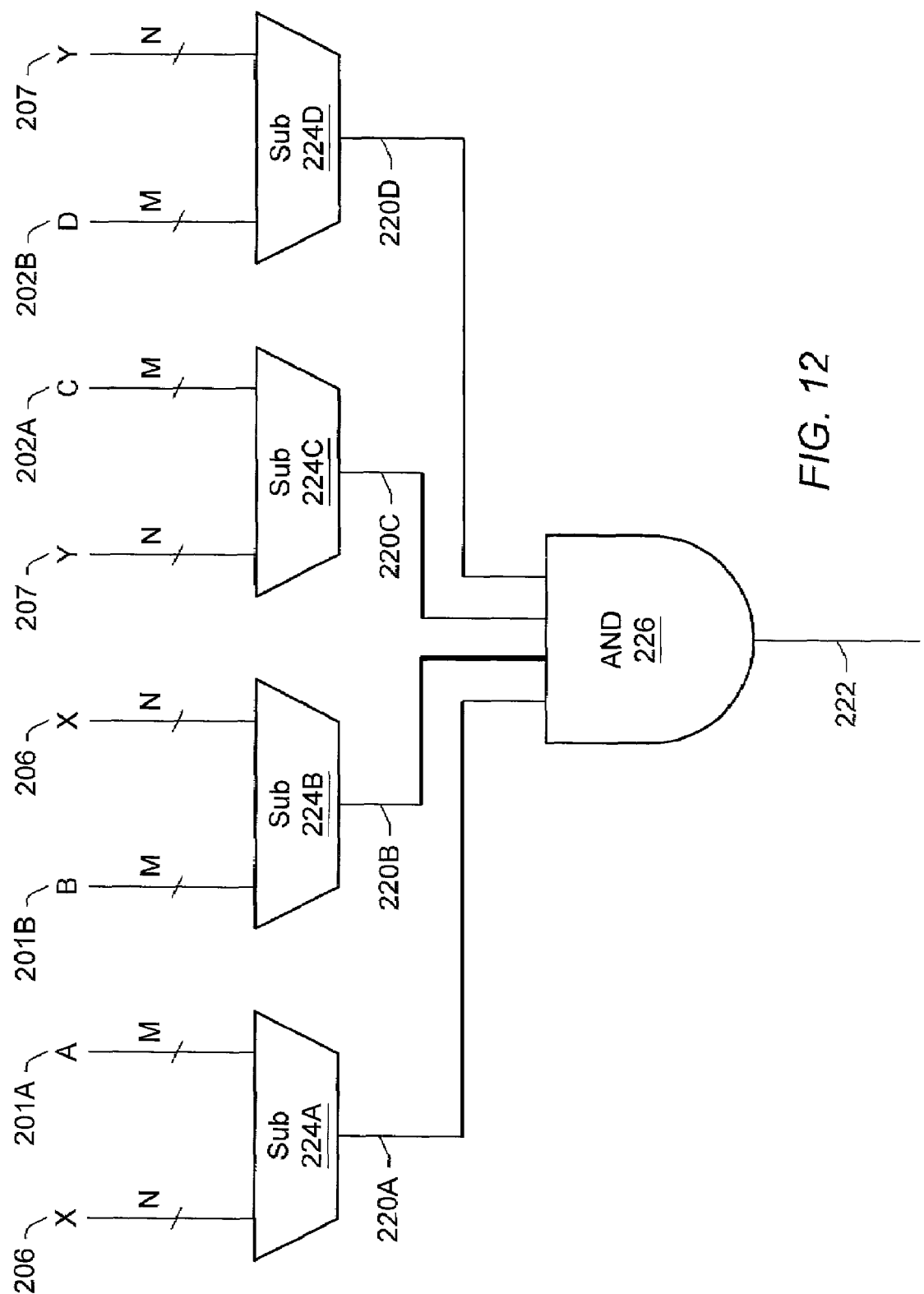
FIG. 12 is an illustration of an exemplary pipeline segment, according to one embodiment.

FIG. 9—Flowchart Diagram for Comparing a Pixel Against One or More Windows Using a Pipeline FIG. 9 is a high level flowchart diagram illustrating one embodiment of a method for comparing a pixel (i.e. a pixel position) against one or more windows 200 using a pipeline, also referred to herein as a "2-D clipping pipeline", e.g., the pipeline 230 as illustrated in FIG. 12.

In step 300, the method comprises passing the pixel through the pipeline 230. The pipeline may comprise two or more pipeline segments, as illustrated in FIGS. 11a-11f. The number of pipeline segments 231A-231E may vary depending on implementation of the pipeline.

In step 302, the method may comprise computing a window result 222 in each one of the two or more pipeline segments 231A-231E, as shown in FIG. 12. Each one of the two or more pipeline segments 231A-231E corresponds to one of the one or more windows 200A-200C. The window result 222 comprises an indication of inclusion of the pixel within the corresponding one of the one or more windows 200A-200C.

In step 304, the method may comprise outputting a window word from each one of the two or more pipeline segments 231A-231E. In one embodiment, the process of outputting the window word 260 comprises, for each of two or more pipeline segments 231A-231D, except for a last pipeline segment 231E, passing the window word 260 to a next pipeline segment. The window word 260 comprises the window result 222 and the window results 222 from previous segments.

In step 304, the method may comprise examining the window word 260 available from the last pipeline segment 231E. The window word 260 may be examined for determination of inclusion of the pixel in one of the one or more windows 200A-200C.

It is noted that the flowchart of FIG. 9 is exemplary only. Further, various steps in the flowchart of FIG. 9 may occur concurrently or in different order than that shown, or may not be performed, as desired. Also, various additional steps may be performed as desired.

Figure 10:
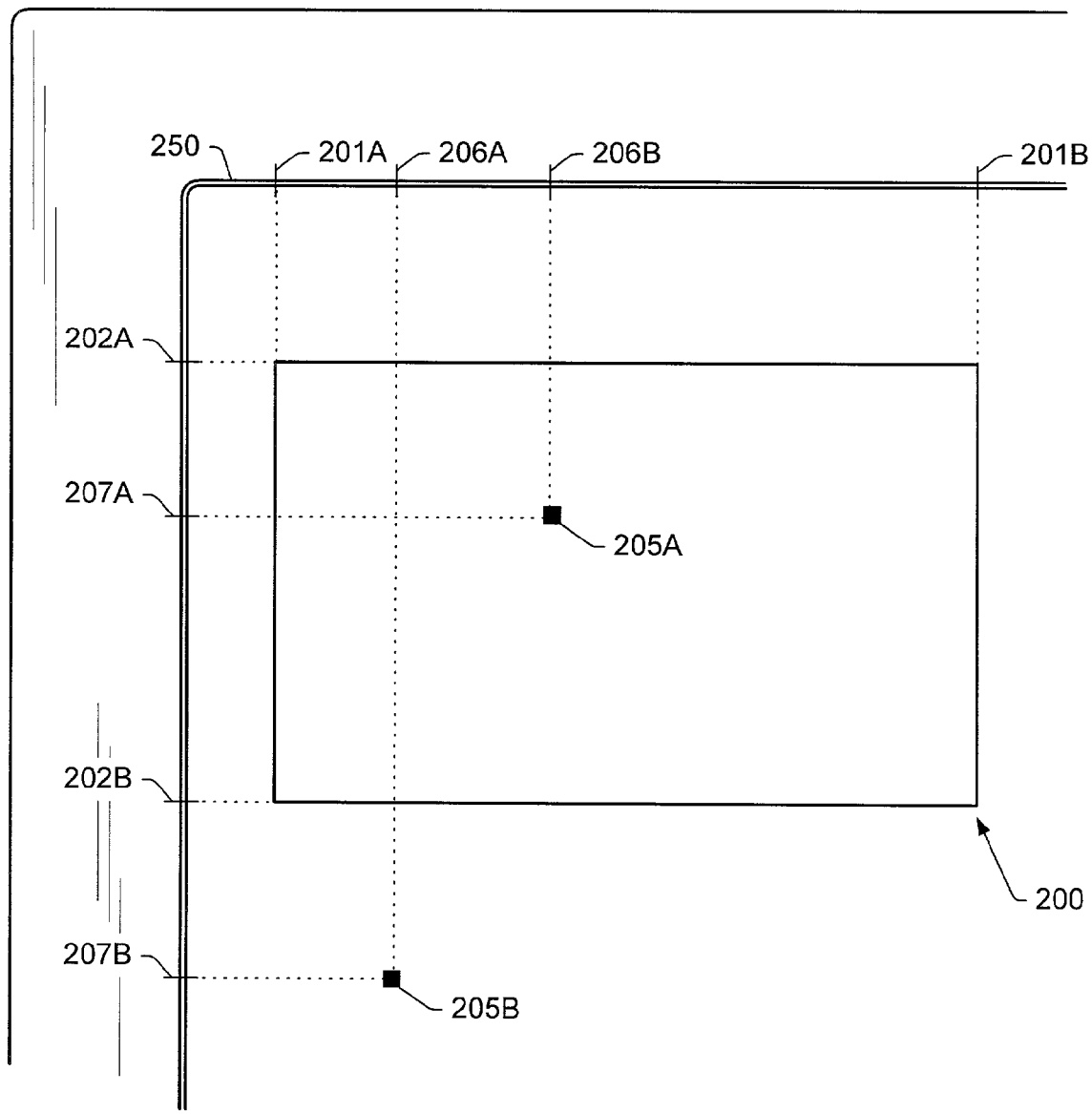
FIG. 10 is an illustration of pixel inclusion computation, according to one embodiment.
Figure 11:
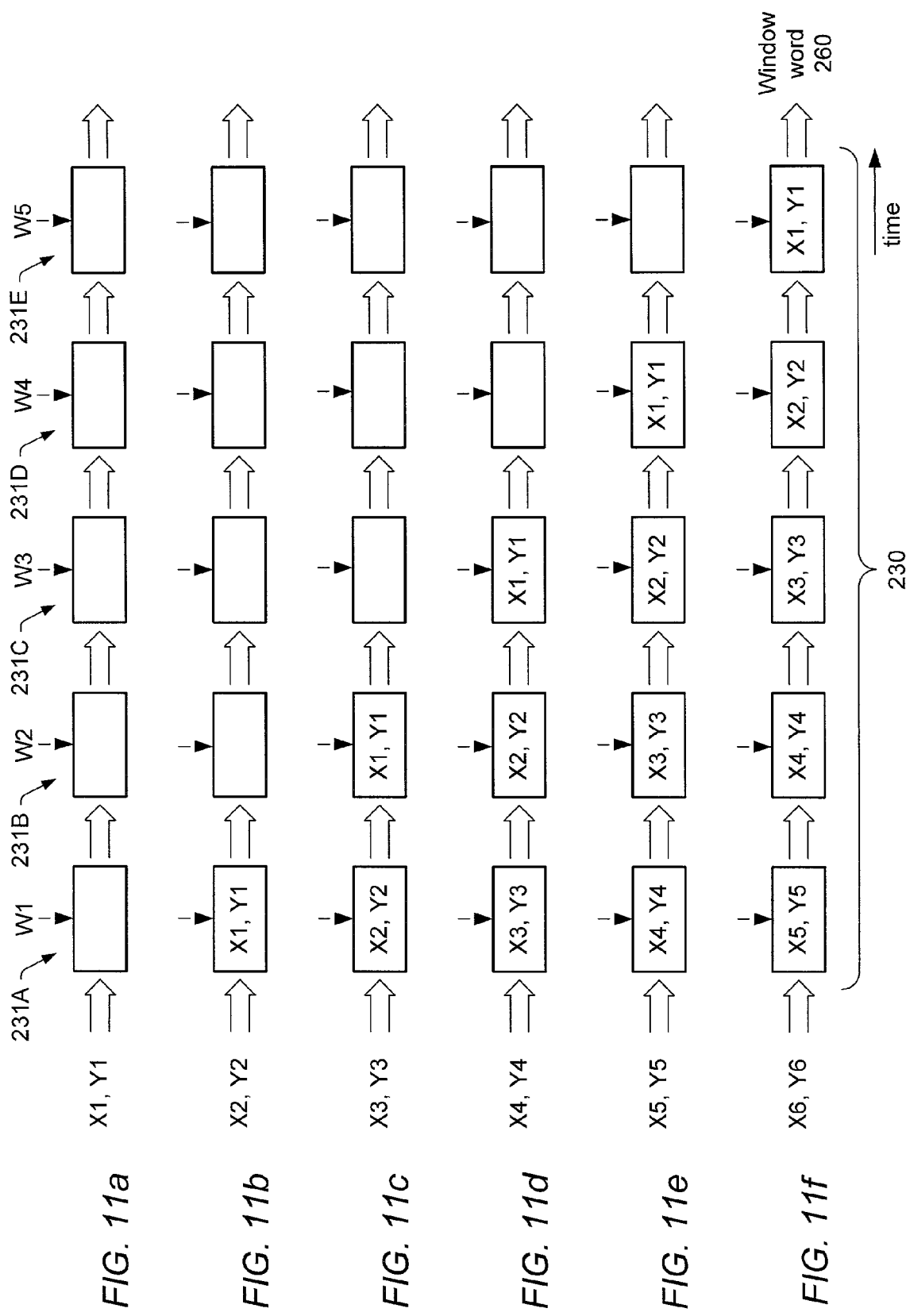
FIG. 11 is an illustration of a 2-D clipping pipeline, according to one embodiment.

FIG. 10—Illustration of Pixel Inclusion Computation

FIG. 10 is an illustration of pixel inclusion computation, according to one set of embodiments.

In one embodiment, screen 250 comprises horizontal and vertical coordinates operable to describe pixel positions in 2-D space. Screen 250 may display the one or more windows 200, and pixels, such as pixels 205A and 205B. In one embodiment, each of the one or more windows may comprise a first horizontal 201A and a second horizontal coordinate 201B and a first vertical 202A and a second vertical coordinate 202B that define boundaries of each of one or more windows 200 on the screen. In one embodiment, the pixel 205A (205B) may comprise a horizontal coordinate 206A (206B), and a vertical coordinate 207A (207B) that define the position of the pixel 205A (205B) on the screen 250.

In one embodiment, as described below with more detail with reference to FIGS. 11a-11f and FIG. 12, the method may comprise computing horizontal inclusion and vertical inclusion. The horizontal inclusion may be computed by computing if the horizontal pixel coordinate 206A (206B) is located between the first horizontal 201A and the second horizontal coordinate 201B of each of the one or more windows 200. The vertical inclusion may be computed by computing if the vertical pixel coordinate 207A (207B) is located between the first vertical 202A and the second vertical coordinate 202B of each of the one or more windows 200.

FIGS. 11a-11f—Exemplary Illustration of a 2-D Clipping Pipeline

FIGS. 11a-11f are exemplary illustrations of a 2-D clipping pipeline 230, also referred to simply as "pipeline" 230, according to one set of embodiments. The pipeline 230 may comprise two or more pipeline segments 231A-231E. The number of pipeline segments 231A-231E may vary depending on the implementation. Each one of the two or more pipeline segments 231A-231E may correspond to one of the one or more windows 200A-200C. Each of the two or more pipeline segments 231A-231E may be provided with boundary coordinates of a corresponding one of the one or more windows on the screen. The boundary coordinates are denoted as W1-W5. For example, the first pipeline segment 231A may be provided with coordinates of a first of the one or more windows, for example window 200A, and a second pipeline segment 231B may be provided with coordinates of a second of the one or more windows, for example window 200B.

In one embodiment, the pixel 205A (205B) may be passed through the pipeline 230, as illustrated by FIGS. 11A-11F. The pixel may be described by X and Y coordinates. Each one of the two or more pipeline segments computes pixel inclusion, or window result 222, for the corresponding one of the one or more windows. The window result 222 along with the pixel coordinates X and Y are then passed to the next pipeline segment 231. The window word 260 available in the last pipeline segment 231E may contain the window result from previous pipeline segments 231A-231D.

In one embodiment, the pixel 205A (205B) may be clipped if an examination of the window word 260 available in the last pipeline segment 231E determines that the pixel 205A (205B) is not included in any one of the one or more windows. Alternatively, the pixel 205A (205B) may be propagated after the examination determines that the pixel 205A (205B) is included in at least one of the one or more windows.

FIG. 12—Exemplary Pipeline Segment

FIG. 12 is an exemplary pipeline segment according to one embodiment of the invention. Each one of the two or more pipeline segments 231A-231E may compute the window result 222. It is noted that various other embodiments of a pipeline segment may exist, and the following discussion is for exemplary purposes only.

In one embodiment, each one of the two or more pipeline segments 231 may comprise four subtraction/comparison units 224A-224D. In one embodiment, the result of the comparison 220A-220D may be output to a multi-input AND gate 226, or an equivalent. In one embodiment, the AND gate 226 may perform a logical AND operation on the comparison inputs 220A-220D, and may output the window result 222, which may comprise an indication of inclusion of a pixel in a window, i.e., whether or not the pixel is included in the window. The horizontal and vertical pixel coordinates may be expressed using N bits. The first and second vertical and horizontal window boundaries may be expressed using M bits.

In one embodiment, a first subtraction/comparison unit 224A may compute if the horizontal pixel coordinate 206 is located on the positive side of the first vertical coordinate of the window 201A. In one embodiment, a second subtraction/comparison unit 224B may compute if the horizontal pixel coordinate 206 is located on the negative side the second vertical coordinate of the window 201B. In one embodiment, a third subtraction/comparison unit 224C may compute if the vertical pixel coordinate 207 is located on the positive side of the first vertical coordinate of the window 202A. In one embodiment, a fourth subtraction/comparison unit 224D may compute if the vertical pixel coordinate 207 is located on the negative side of the first vertical coordinate of the window 202B.

As a result of the AND gate 226 operation, the indication of inclusion of the pixel may be set to positive if the horizontal and vertical inclusions are true. Alternatively, the indication of inclusion of the pixel may be set to negative if one or more of the horizontal and vertical inclusions are false.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for comparing a pixel location against a plurality of windows, the method comprising:
    passing the pixel location through a plurality of clip circuits, wherein the clip circuits are connected in a series to form a pipeline, and wherein each clip circuit is a segment of the pipeline;
    computing a window result in each clip circuit for the pixel location, wherein each clip circuit is provided data defining a different one of the plurality of windows, wherein the window result comprises an indication of inclusion of the pixel location within the corresponding one of the plurality of windows;
    outputting the pixel location and a window word from each clip circuit, wherein said outputting comprises, passing the pixel location and the window word directly to a next clip circuit in the series of clip circuits except for the last clip circuit in the series, and wherein the window word also comprises any previous window results; and
    examining the window word output by the last clip circuit in the series of clip circuits to determine if the pixel is included in at least one of the windows.

2. The method of claim 1, wherein said pixel location comprises a horizontal and a vertical coordinate that define position of said pixel on a screen.

3. The method of claim 2, wherein each of the plurality of windows comprises a first horizontal and a second horizontal coordinate and a first vertical and a second vertical coordinate that define each window's boundaries on the screen.

4. The method of claim 3, wherein said computing window result comprises:
    computing horizontal inclusion by computing if said horizontal pixel coordinate is located between the first horizontal and the second horizontal coordinate of the corresponding window; and
    computing vertical inclusion if said vertical pixel coordinate is located between the first vertical and the second vertical coordinate of the corresponding window.

5. The method of claim 4, wherein said computing window result further comprises: setting the indication of inclusion of the pixel to positive if both the horizontal and vertical inclusions are true, and setting the indication of inclusion of the pixel negative if one or more of the horizontal and vertical inclusions are false.

6. The method of claim 1, further comprising:
    clipping the pixel if said examining determines that the pixel is not included in any of the plurality of windows; and
    propagating the pixel if said examining determines that the pixel is included in at least one of the plurality of windows.

7. The method of claim 1, wherein said plurality of windows comprise two or more 2-D windows.

8. The method of claim 1, wherein said plurality of clip circuits are identical circuits.

9. A method comprising:
    supplying window boundary coordinates for a different one of a plurality of windows to each clip circuit of a plurality of clip circuits connected in a series;
    determining inclusion of a pixel in the corresponding window in each clip circuit; and
    passing the pixel and a result of said determining inclusion to a next clip circuit in the series of clip circuits, except for a last clip circuit of the series of clip circuits.

10. The method of claim 9, wherein said pixel comprises a horizontal and a vertical coordinate that define position of said pixel on a screen.

11. The method of claim 10, wherein each of the plurality of windows comprises a first horizontal and a second horizontal coordinate and a first vertical and a second vertical coordinate that define boundaries of each of the plurality of windows on the screen.

12. The method of claim 11, wherein said computing window result comprises:
    computing horizontal inclusion by computing if said horizontal pixel coordinate is located between the first horizontal and the second horizontal coordinate of the corresponding window; and
    computing vertical inclusion if said vertical pixel coordinate is located between the first vertical and the second vertical coordinate of the corresponding window.

13. The method of claim 12, wherein said computing window result further comprises: setting the indication of inclusion of the pixel to positive if both the horizontal and vertical inclusions are true, and setting the indication of inclusion of the pixel negative if one or more of the horizontal and vertical inclusions are false.

14. The method of claim 9, further comprising:
    clipping the pixel if said examining determines that the pixel is not included in any of the plurality of windows; and
    propagating the pixel if said examining determines that the pixel is included in at least one of the plurality of windows.

15. The method of claim 9, wherein said plurality of windows comprise two or more 2-D windows.

16. The method of claim 9, wherein said plurality of clip circuits are identical circuits.

17. A system for determining inclusion of a pixel with respect to each of a plurality of windows, the system comprising:
    a plurality of clip circuits connected in a series, wherein each circuit in the series is configured to:
        (a) receive horizontal and vertical coordinates locating a pixel, (b) receive horizontal and vertical coordinates defining a different one of a plurality of windows, (c) compute a window result indicating inclusion of the pixel within the corresponding window defined in (b), and except for a last clip circuit in the series, (d) pass the horizontal and vertical coordinates of the pixel, the window result computed in (c), and any prior window results to a next clip circuit in the series of clip circuits.

18. The system of claim 17, wherein a first horizontal and a second horizontal coordinate and a first vertical and a second vertical coordinate corresponding to each window define boundaries of each of the plurality of windows in a two-dimensional space.

19. The system of claim 17, wherein the system is further configured to:

clip the pixel if all window results indicate the pixel is not included in any of the plurality of windows; or propagate the pixel if all window results indicate the pixel is included in at least one of the plurality of windows.

20. The system of claim 17, wherein the plurality of windows comprises two or more 2-D windows.

21. The system of claim 17, wherein the plurality of clip circuits are identical circuits.

22. The system of claim 17, wherein each clip circuit of the plurality of clip circuits is directly connected to the next clip circuit in the series of clip circuits.

23. The system of claim 17, wherein the plurality of clip circuits form a pipeline, and each clip circuit is a segment of the pipeline.

* * * * *